Jan. 1, 1935.  E. T. G. DAHLSTROM ET AL  1,986,560
WINDSHIELD ATTACHMENT
Filed Jan. 9, 1929  2 Sheets-Sheet 1
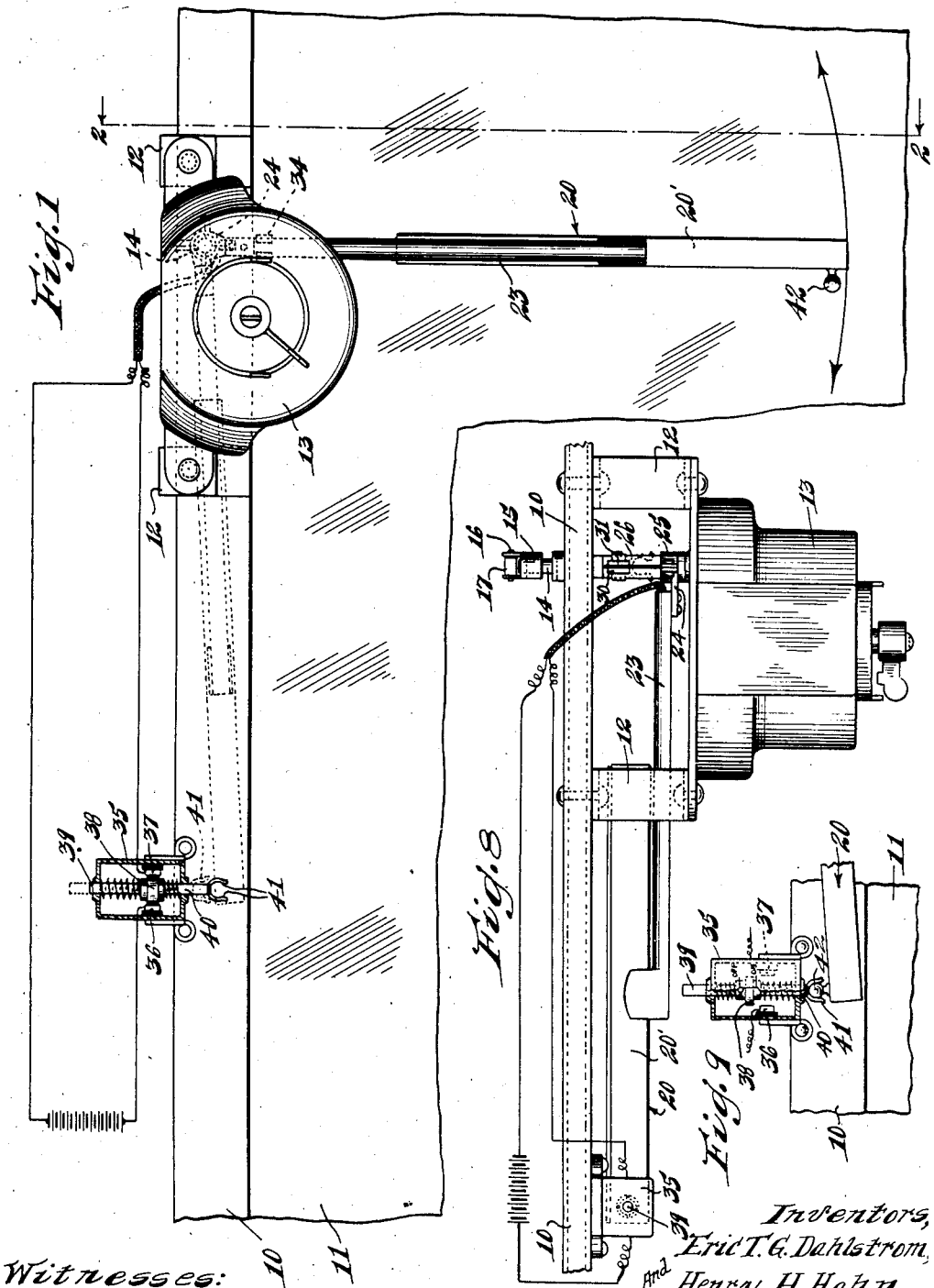
Witnesses:
Inventors,
Eric T. G. Dahlstrom,
And Henry H. Hahn,
By Joshua R H Potk
their Attorney.

Jan. 1, 1935. E. T. G. DAHLSTROM ET AL 1,986,560
WINDSHIELD ATTACHMENT
Filed Jan. 9, 1929 2 Sheets-Sheet 2
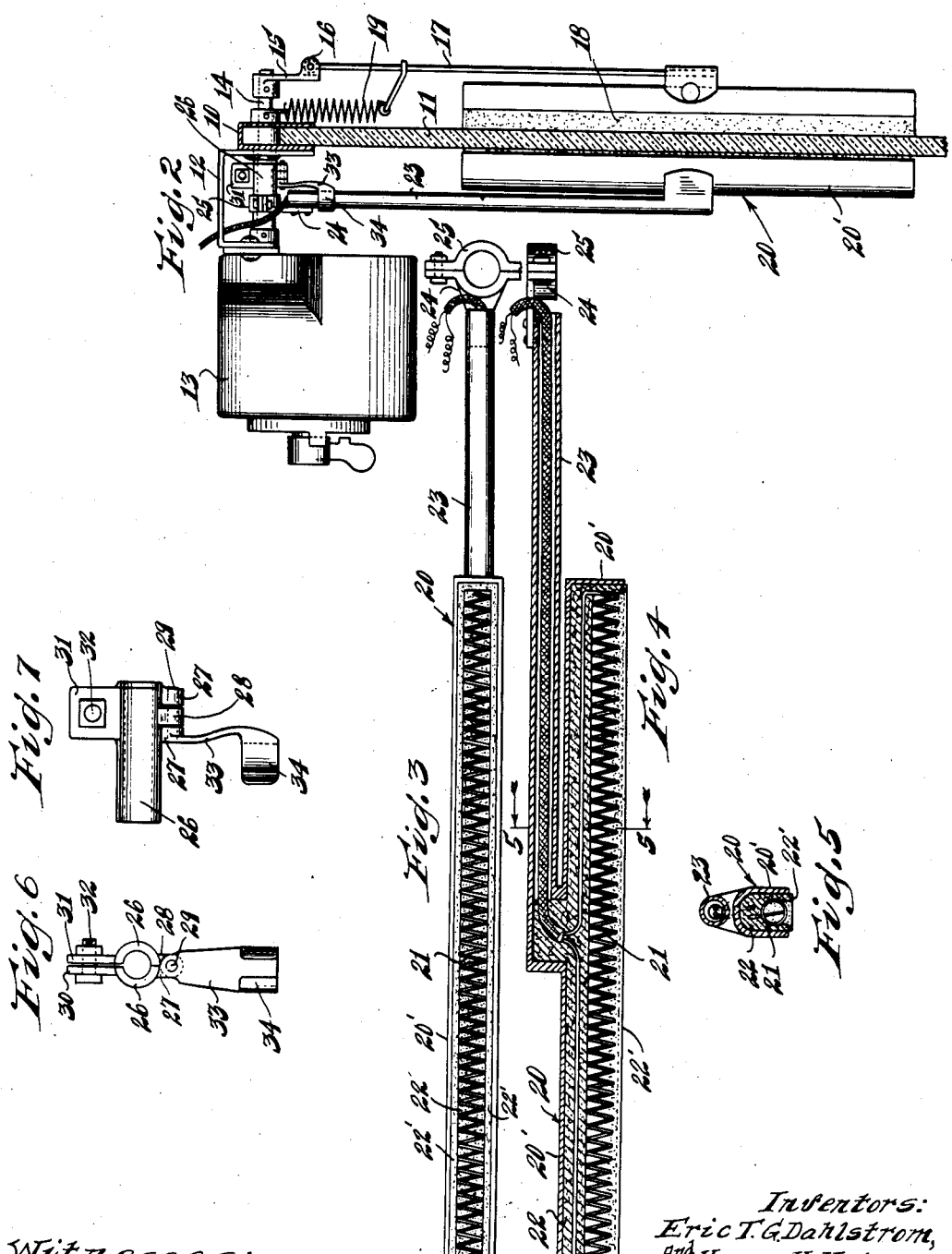
Inventors:
Eric T. G. Dahlstrom,
And Henry H. Hahn,
By Joshua R. H. Potts
their Attorney.

Patented Jan. 1, 1935

1,986,560

UNITED STATES PATENT OFFICE 1,986,560

WINDSHIELD ATTACHMENT

Eric T. G. Dahlstrom and Henry H. Hahn, Chicago, Ill.; said Hahn assignor to said Dahlstrom Application January 9, 1929, Serial No. 331,196

3 Claims. (Cl. 219—19)

This invention relates to windshield attachments and has for its principal objects to prevent frosting or the accumulation of snow or sleet on the glass within the range of vision of the driver as covered by the usual windshield wiper, in connection with which latter the device of the present invention is more particularly designed to cooperate.

Other objects and advantages to be attained will be more fully hereinafter described.

The invention consists in the novel construction and arrangement of a heating element and in its peculiar application to the windshield of an automobile or the like as hereinafter set forth and defined in the appended claims.

In the accompanying drawings forming part of this specification and illustrating a practical adaptation of the invention, Fig. 1 is a fragmentary view of a windshield equipped with the device of the present invention;

Fig. 2 is a section on the line 2—2 of Fig. 1;

Fig. 3 is an edge view of the heating element detached;

Fig. 4 is a longitudinal section through said heating element;

Fig. 5 is a cross section on the line 5—5 of Fig. 4;

Fig 6 is an end view of a special adaptor for applying the heating element to the drive shaft of an ordinary windshield wiper;

Fig. 7 is a side view of said adaptor;

Fig. 8 is a fragmentary top edge view of the windshield equipped with an ordinary windshield wiper and cooperating heating element of the present invention, the latter being illustrated as in its inoperative position; and Fig. 9 is a detail view of the circuit breaker for the heating element, illustrating the cooperation thereof with the heating element in its inoperative position.

Referring now to the drawings, numeral 10 designates the frame of an ordinary windshield and 11 the glass panel thereof. Mounted on the frame member 10, as by suitable brackets 12 is the motor housing 13 of an ordinary windshield wiper, the latter being disposed, in this instance, on the inner side of the shield. Extending outwardly beyond the frame 10 is the operating shaft 14 on which is secured an arm 15 having hinged thereon, as at 16, a rod 17 at the end of which is pivotally attached the wiper blade or squeegee 18 which operates across the outer face of the glass panel 11 and is yieldably held in contact therewith by the spring element 19.

The heating element of the present invention, designated generally by the reference numeral 20, is preferably located on the inner side of the windshield in opposed relation to the above mentioned wiper member 18 and it is mounted on the shaft 14 with provision for thereby actuating it simultaneously and in parallel relation with said member 18, and also having provision for rendering it inoperative, at will.

The heating element comprises a narrow longitudinally slotted member or casing 20' composed of suitable material of non-electric conductivity such as wood, compressed fiber, bakelite or similar material and having located therein an ordinary heating coil 21, and being preferably provided with an insulation 22 of asbestos or the like between said coil 21 and the walls of the member 20'. It is also preferable to extend the marginal portion 22' of said material 22 a short distance beyond the edges of the walls of said member 20' so as to brush the face of the glass panel 11 of the windshield without scratching. Extending from the center of the member 20' is a tubular rod 23 to which is rigidly attached the bracket member 24 having a split ring portion 25 at its outer end, said portion being rotatably and longitudinally mounted on a split sleeve 26 which latter is clamped tightly on the shaft 14 of the windshield actuating mechanism. The sleeve member 26 has its two sections respectively provided with lugs 27 and 28 that are hinged together as at 29, said member 26 having opposed lugs 30 and 31 which are apertured to receive the clamping bolt 32. Extending from one of the lugs 27 of the member 26 is a bracket arm 33 having at its end a bifurcated spring clip 34 for the engagement of the rod 23, which engagement is effected by sliding the sleeve portion 25 longitudinally on said sleeve 26, and when so engaged the rod 23, of course, moves in fixed relation to said shaft 14, and further, by the provision of the split sleeve 26 said rod 23 may obviously be set in parallel relation to the rod 17 of the windshield wiper on the outside of the glass and operated in unison therewith.

The heating element 20 may be connected with any suitable source of electrical supply conveniently located on the automobile but its preferable to provide a special circuit closing and breaking device in convenient reach of the driver of the car and having provision for the engagement of the heating element 20 therewith as will now be described. This circuit closing and breaking device comprises a casing 35 within which are two opposed terminal contact points 36 and 37 with which cooperates a reciprocatory contact member 38, the latter having guide rods 39 and 40 extending therefrom in opposite directions and working through axial apertures provided therefor in the end walls of said casing 35, said guide rods having light springs coiled about them and interposed between the contact member 38 and the opposite end walls of the casing 35. The extension 40 of said contact member 38 is provided at its outer end with a spring clip 41 to receive a rounded projection or knob 42 on the member 20' so as to releasably hold the heating device in inoperative position as will now be explained.

Normally, the contact member 38 of the circuit closure is in engagement with the terminal points 36 and 37 and the electrical circuit is closed so that the current is passing through the heating coil 21 and at this time, and if the outer windshield wiper 18 is operating, said heating element 20 is likewise moving with the latter and in parallel relation thereto, thus heating the glass panel 11 sufficiently to prevent frosting thereof in the range of vision as covered by the oscillatory movement of the windshield wiper.

When it is desired to discontinue the use of the heating element in connection with the windshield wiper it is only necessary to slide the sleeve portion 25 longitudinally on the sleeve 26 and disengage the rod 23 from the clip 34, at which time the rod 23 ceases to operate with the shaft 14 and is free to be moved independently of said shaft about the axis thereof and whereby the heater may be moved manually by the driver of the car and the knob portion 42 on the member 20' snapped forcibly into the spring clip 41, so as to move the rod 40 upward and force the contact member 38 from engagement with the terminal contact points 36 and 37, thereby breaking the electrical circuit, as best shown in Figs. 1 and 9 of the drawings. By this arrangement it is just as simple a matter to withdraw the member 20' from the circuit breaker 35 and slide the member 24 on the sleeve 26 thereby engaging the rod 23 with said spring clip 34.

The invention comprehends broadly the application of a heating device in conjunction with a windshield wiper and regardless of the details of structure or whether applied to the inside or outside of the glass panel of the windshield, and as the device admits of considerable modification and alteration without departing from the spirit and scope of the invention as defined by the appended claims, the invention is not limited to the specific details of the construction and arrangement shown in the accompanying drawings.

Having thus described our invention what we claim as new and desire to secure by Letters Patent is:

1. In a device of the class described, a movably operable heating element, an actuator for said element, means for releasably connecting said heating element with said actuator whereby to operate said heating element, said heating element when disconnected from said actuator being independently operable by manual manipulation, a circuit make and break device arranged adjacent a limit of movement of said heating element and means on said make and break device for releasably engaging said heating element when manually raised into engagement therewith, the engagement of the heating element therewith being adapted to operate said make and break device to break the circuit to the heating element.

2. In a device of the class described, a movably operable heating element, an actuator for said element, means for releasably connecting said heating element with said actuator whereby to operate said heating element, said heating element when disconnected from said actuator being independently operable by manual manipulation, a circuit make and break device arranged adjacent a limit of movement of said heating element, said make and break device comprising a pair of terminals, a vertically movable rod, a contact member on said rod adapted to be raised out of contact with said terminals to break the circuit, and means on said rod for releasably engaging said heating element when manually forced into engagement therewith, substantially as described.

3. In combination with a rotatable element, a heating element, means to disconnectedly couple said heating element to the rotatable element, an electric circuit for said heating element, and a switch in said circuit to be opened through the medium of the heating element when the latter is moved into engagement with said switch to shut off the supply of electricity to the heating element.

ERIC T. G. DAHLSTROM.
HENRY H. HAHN.